Figure 4:
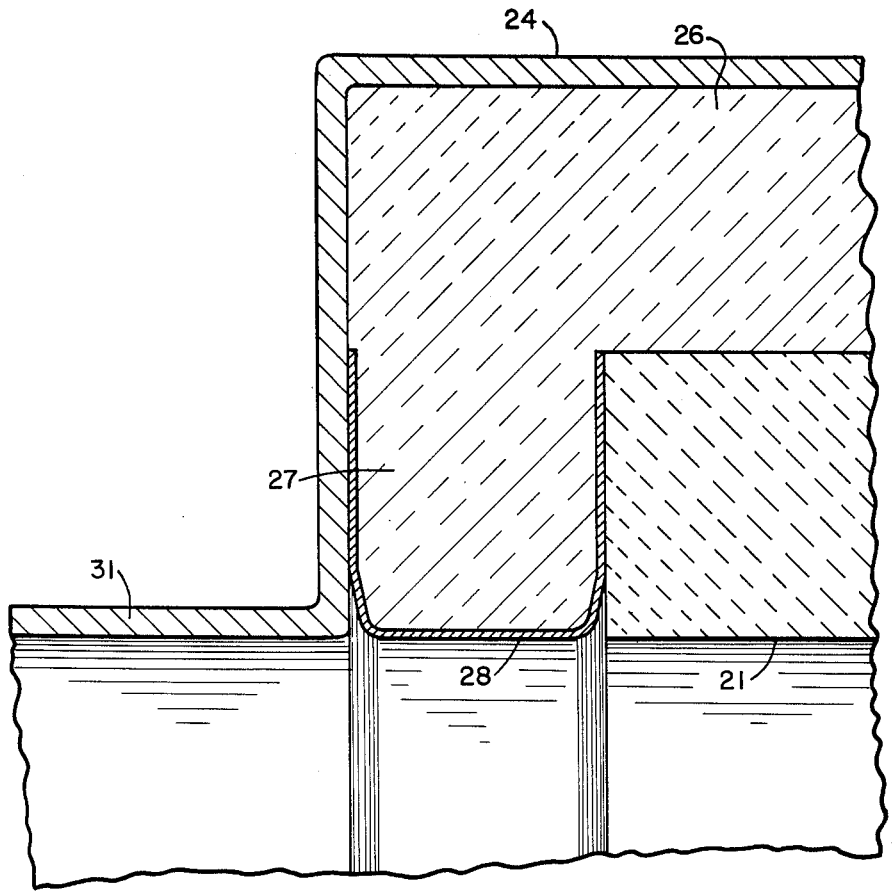

Jan. 4, 1966  D. R. MATTOON  3,227,242
CERAMIC MUFFLER WITH RESILIENT SEALING GASKETS
Filed June 22, 1964  2 Sheets-Sheet 1
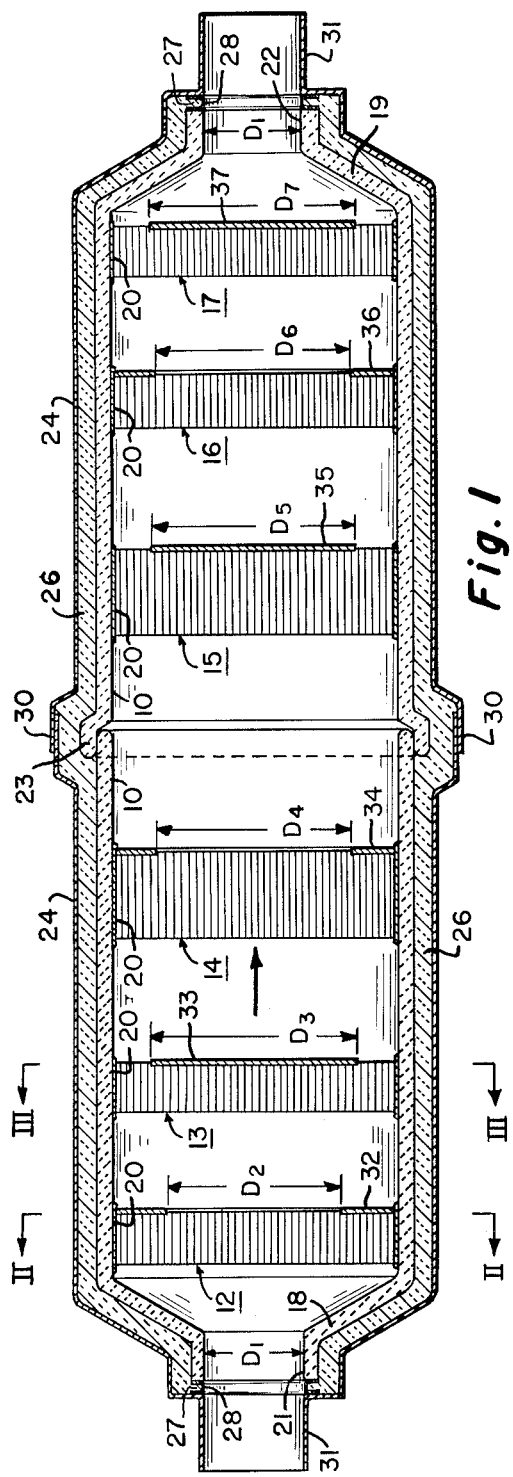
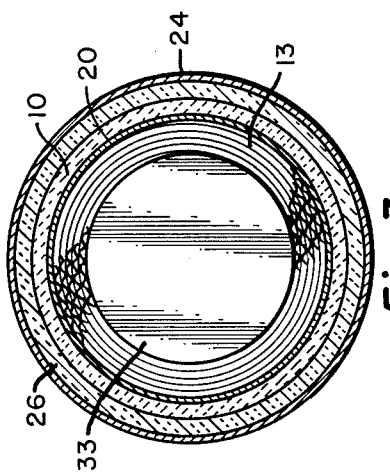
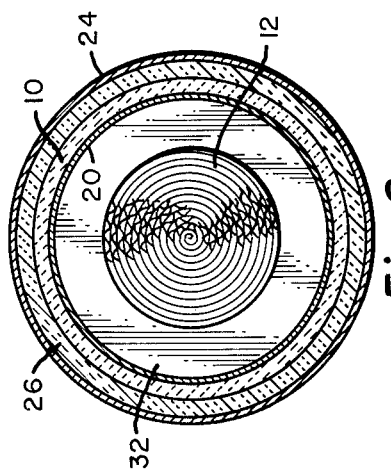
INVENTOR.
Deo R. Mattoon
BY Clarence R. Patty Jr.
ATTORNEY Jan. 4, 1966   D. R. MATTOON   3,227,242
CERAMIC MUFFLER WITH RESILIENT SEALING GASKETS
Filed June 22, 1964   2 Sheets-Sheet 2

INVENTOR.
Deo R. Mattoon
BY
ATTORNEY

United States Patent Office 3,227,242
Patented Jan. 4, 1966

3,227,242
CERAMIC MUFFLER WITH RESILIENT
SEALING GASKETS
Deo R. Mattoon, Horseheads, N.Y., assignor to Corning
Glass Works, Corning, N.Y., a corporation of New
York
Filed June 22, 1964, Ser. No. 376,931
5 Claims. (Cl. 181—61)

This invention relates to the deadening or suppressing of sound by means of an acoustic filter or silencer device. In particular, it relates to a novel resistive ceramic muffler assembly for the exhaust system of internal combustion engines and the like.

Recently, research into improved means for attenuating sound in the exhaust gas stream from internal combustion engines has led to development of noise suppressor devices comprising an all-ceramic, corrosion resistant and refractory acoustic filter including sintered ceramic honeycomb resistive elements positioned within a sintered ceramic casing by means of a sintered ceramic bond. Some of these devices are disclosed in my copending application Serial No. 351,949 filed March 16, 1964.

Ceramic material most commonly contemplated for use in construction of the all-ceramic noise suppressor devices exhibits coefficients of thermal expansion substantially smaller than those exhibited by the steel commonly used for the adjoining exhaust or tailpipe members. This expansion coefficient mismatch causes serious difficulties in joining the ceramic structure to the metal exhaust pipe. During heating in service, the joints either become loosened, resulting in an objectionable rattle and leakage of the lethal, corrosive, hot exhaust gases at an improper point along the exhaust system, or they become severely stressed, leading to fracture of the relatively more brittle ceramic casing and again leakage of the exhaust gases. Moreover, when the ceramic casing is joined directly between two exhaust pipe sections as a load bearing member, the bending forces and torsion forces exerted upon or transmitted along the exhaust pipe system tend to unduly stress the relatively brittle ceramic structure to the point of causing mechanical disruption or fracture therein.

The foregoing circumstances have made it a practical necessity to enclose the all-ceramic suppressor devices in sheet metal casings or the like, to which the exhaust pipe members are connected or joined instead of to the ceramic casing. In addition to avoiding most of the problems noted above, the outer metal casing also protects the ceramic structure from being destructively impacted by flying objects, such as stones. However, the expansion coefficient mismatch between the ceramic and the metal still presents problems of rattling and leakage of the hot corrosive gases to the space between the outer metal casing and the inner ceramic casing.

I have now discovered that all the foregoing problems can be obviated by enclosing the all-ceramic noise suppressor device in a metallic casing or sheath having end walls held in spaced adjacent relation from the end walls of a ceramic casing by gas-impermeable, resilient, compression gaskets that are partially compressed in the assembly in the initial manufactured state at room temperature. Additionally, it has been found advantageous to dispose in the remaining space between the outer metallic casing and the inner ceramic casing a resilient insulating shield or layer to further assist in protecting the ceramic casing, to further assist in accommodating the thermal expansion coefficient mismatch without developing any rattle, and to reduce the amount of any heat and sound that would otherwise be transmitted through the ceramic casing to the outer metallic casing.

Figure 5:
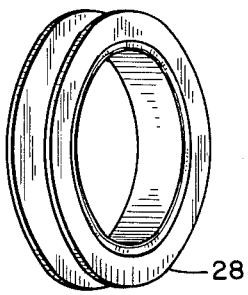

The invention will best be understood by reference to the attached drawings wherein:

FIGURE 1 is a longitudinal view in cross section of one specific embodiment of the present invention, FIGURE 2 is a sectional view taken along line II—II in FIGURE 1, FIGURE 3 is a sectional view taken along line III—III in FIGURE 1, FIGURE 4 is an enlarged fragmentary view of one end portion of the embodiment shown in FIGURE 1, and FIGURE 5 is a perspective view of a gas-impermeable member of a preferred resilient compression gasket according to the present invention.

Referring now to FIGURES 1–3, the all-ceramic muffler or noise suppressor device includes a compatible sintered ceramic shell or casing 10 and compatible sintered ceramic honeycomb resistive elements 12–17 rigidly bonded to the casing 10 by means of a compatible sintered ceramic cement 20.

By the term "compatible," I mean that the sintered ceramics used have essentially similar coefficients of thermal expansion so as to avoid fractures and physical destruction of the device upon being subjected to repeated and substantial changes in temperature. Preferably, the sintered ceramics should also have low thermal expansion coefficients (i.e. $-10$ to $+10 \times 10^{-7}/°$ C. over extended temperature range) to minimize the thermal stresses in the device.

Casing 10 includes an inlet end wall 18 and an outlet end wall 19. The inlet end wall 18 has an inlet port 21 and outlet end wall 19 has an outlet port 22. Both ports have diameters $D_1$. Preferably, the casing 10 is made in two sections as shown and provided with a ship's lap 23 to render the two sections separable. Alternatively, casing 10 can be made one unitary piece as desired, e.g. by forming a bond of sintered ceramic cement at ship's lap 23.

In the embodiment shown in FIGURES 1–3, the resistive elements are of two types, each alternating with the other along a series defining an irregular gas flow path. Each type of element comprises a central portion bounded by an outer portion with each of these portions being substantially symmetrical about the axis of the series. The outer perimeter of these central and outer portions can be of various configurations as desired, e.g. circular, oval, square, rectangular, triangular, polygonal, etc.

The central portions having outside diameters $D_2$, $D_4$, $D_6$ of the first type elements 12, 14, 16 and the outer annular portions having inside diameters $D_3$, $D_5$, $D_7$ of the second type elements 13, 15, 17 comprise open passage, thin walled honeycombs generally defining an irregular gas flow path.

The outer annular portions having inside diameters $D_2$, $D_4$, $D_6$ of the first type elements 12, 14, 16 and the central portions having outside diameters $D_3$, $D_5$, $D_7$ of the second type elements 13, 15, 17 comprise imperforate barriers, preferably with cul de sacs in which part of the sound energy carried in the exhaust gas stream is dissipated by cancellation due to the reflectance of the sound wave from the closed end surface or closure of the gas passage more fully described below.

In this embodiment, the total area of the central portion of the second type element should be at least about equal to the total area of the central portion of adjacent first type elements. Thus, the open cells or open gas passages of one type element are axially opposite the barrier portion of the other type element along the series. This causes the gas stream to travel in a sinuate path as it progresses through the noise suppressor device and results in substantially reducing the outlet sound level below that obtained in previous devices having the open cells all opposite each other in straight-through alignment (i.e., regular gas flow path of straight line configuration).

Also, it is important that the total open area of the open passage portions of each honeycomb resistive element must be not less than, and desirably greater than, the area of the inlet port (based upon diameter $D_1$) in order to obtain excellent and essential low back pressure as the gas stream flows through them. Preferably, each open passage portion has a total open area of about two to three times the area of the inlet port. Also, the outlet port should have an area at least equal to the inlet port area for the same reason.

The cul de sacs of elements 12–17 are formed by providing sintered ceramic coatings 32–37 on the outlet faces or surfaces of the elements. These coatings 32–37 seal or close off the cells or gas passages terminating at the outlet surface areas covered by the coatings. Coatings 32, 34, 36 form the outer annular barrier zones or portions of elements 12, 14, 16 that surround the central portions of open passage cells. In an opposite manner, coatings 33, 35, 37 form the central circular barrier zones or portions of elements 13, 15, 17 that are surrounded by the outer annular portions of open passage cells.

Referring now to FIGURES 1, 4 and 5, the all-ceramic noise suppressor device is positioned in an outer metallic shell 24 by means of gas-impermeable, resilient, compression gaskets 27–28 and additionally by a resilient insulating shield 26. The outer metallic shell 24 is made of a corrosion resistant sheet metal (for example, aluminized low carbon steel or stainless steel) and in two separable parts with a telescopic joint 30. Also, shell 24 includes coupling extensions 31 at the inlet and outlet ends for joinder with exhaust pipe members. As shown, the preferred gas-impermeable, resilient, compression gasket comprises two members: a flexible metal ring member 28 having a generally U-shaped radial cross section and a resilient mineral fiber or wool filler or mass 27 within the U-shaped space of the metal ring 28. Insulation shield 26 is a continuation of the same material as filler 27 in the preferred embodiment. As is well known, mineral fiber layers or masses can be formed by patting or spraying a moistened mixture of suitable mineral fibers or wool (which can include, for example, slag wool, asbestos fibers, etc.) and an appropriate binder, either inorganic or organic as is well known in the art. This mixture is patted or sprayed on the desired surface as desired. Spraying can be done by means of a pneumatic pressure device. Examples of the latter device are shown in United States Patents 2,890,079 and 3,023,967. The patted or sprayed mineral wool-binder layer has a considerable degree of compressibility, commonly being as much as 35% of its original thickness. The mineral fiber-binder layer is also notably characterized by good resiliency at all temperatures to which it may be subjected as the filler 27 and shield 26 in the assembly according to the present invention.

In constructing the assembly according to this invention, the all-ceramic acoustic filter contained in ceramic casing 10 is suitably manufactured, for example, as described in my aforementioned copending application. Then this acoustic filter unit and metal ring member 28 are assembled in a rotatable jig and the resilient mineral fiber layer is patted or sprayed onto the appropriate surfaces while the assembly is rotated. The resilient mineral fiber layer is built up slightly greater than the space between the ceramic casing 10 and the metal casing 24. Next, the metal casing members 24 are slipped over the resilient mineral fiber layer and pushed together to form the telescopic joint 30. The metal casing members 24 are forced together sufficiently to partially compress the gaskets 27–28 and, while held in that position, they are spot-welded together at the joint 30. Preferably, the gaskets 27–28 are compressed slightly more than half of its total compressibility (e.g. compressed about 20% when the total compressibility is about 35%). During heating of the assembly in service, the metal casing 24 can expand away from the ceramic casing 10 without the exhaust gases leaking between them. This is accomplished by the fact that the resilient mineral fiber filler 27 will expand and cause the metal ring gasket members 28 to also expand so that the ring members 28 continuously abut, and maintain a gas-impermeable seal between the ends of ceramic casing 10 and the adjacent facing walls of metal casing 24. In effect, the all-ceramic acoustic filter will "float" within the metal casing 24 during changes in temperature of the assembly. By not initially compressing the gaskets 27–28 to the full extent of their compressibility, this allows for their further compression during the winter periods when the assembly is not in use. The latter condition will obviously occur at such lower temperatures also due to the thermal expansion coefficient mismatch.

Of course, it will be appreciated that resilient mineral fiber layer 26 will also expand and contract, due to its resiliency, with differential expansion and contraction between the metal casing 24 and ceramic casing 10.

It will be appreciated that the invention is not limited to the specific details illustrated, except insofar as specified in the claims, and that various changes or modifications may be made within the ordinary skill of the art without departing from the spirit and scope of the invention.

I claim:

1. An assembly, suitable for suppressing noise in a gas stream, comprising:
   (a) an all-ceramic acoustic filter device contained in a ceramic casing, said ceramic casing including opposite inlet and outlet end walls have inlet and outlet ports, respectively,
   (b) a metallic casing enclosing and spaced from said ceramic casing, said metallic casing, including (1) opposite inlet and outlet end walls in spaced adjacent relationship to the corresponding end walls of said ceramic casing, and (2) inlet and outlet coupling extensions integrally joined to the inlet and outlet end walls, respectively, of said metallic casing,
   (c) a gas-impermeable, resilient compression gasket disposed between and abutting on the spaced adjacent inlet end walls of said ceramic and metallic casings, said gasket being compressed at least a portion of its total compressibility, and
   (d) a gas-impermeable, resilient compression gasket disposed between and abutting on the spaced adjacent outlet end walls of said ceramic and metallic casings, said gasket being compressed at least a portion of its total compressibility.

2. An assembly according to claim 1 wherein said gaskets comprise:
   (a) a flexible metallic member adapted and arranged to form a gas-impermeable wall across the space between pairs of spaced adjacent end walls, and having rims abutting each of said end walls and defining a space between said rims, and
   (b) resilient mineral fiber mass filling said space between said rims.

3. An assembly according to claim 2 wherein said gaskets, in the initial manufactured state, are compressed slightly more than 50% of their total compressibility.

4. An assembly according to claim 1 wherein a resilient insulation shield is disposed in the remaining space between said ceramic casing and said metallic casing.

5. An assembly according to claim 4 wherein said resilient insulation comprises a mineral fiber mass completely filling said remaining space and being under at least a slight compression in the initial manufactured state.

References Cited by the Examiner

UNITED STATES PATENTS

| | | | |
|---|---|---|---|
| 722,567 | 3/1903 | Crawford | 181—62 X |
| 2,019,746 | 11/1935 | Tatter. | |
| 2,072,961 | 3/1937 | Nelson | 181—50 |
| 2,981,057 | 4/1961 | Buttler | 181—62 X |
| 3,163,256 | 12/1964 | Lanning | 181—56 |

FOREIGN PATENTS

| | | |
|---|---|---|
| 1,248,627 | 11/1960 | France. |
| 808,806 | 2/1959 | Great Britain. |

LEO SMILOW, *Primary Examiner.*